US008803701B2

(12) United States Patent
Koppal et al.

(10) Patent No.: US 8,803,701 B2
(45) Date of Patent: *Aug. 12, 2014

(54) PORTABLE ELECTRONIC DEVICE HAVING HOLSTER AND INCLUDING A PLURALITY OF POSITION SENSORS

(71) Applicant: BlackBerry Limited, Waterloo (CA)

(72) Inventors: Rohit Krishna Koppal, Pompano Beach, FL (US); Douglas Wayne Moskowitz, Weston, FL (US); Aaron Robert Allen, Pembroke Pines, FL (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/057,858

(22) Filed: Oct. 18, 2013

(65) Prior Publication Data

US 2014/0045559 A1    Feb. 13, 2014

Related U.S. Application Data

(63) Continuation of application No. 13/030,884, filed on Feb. 18, 2011, now Pat. No. 8,581,739.

(60) Provisional application No. 61/305,924, filed on Feb. 18, 2010.

(51) Int. Cl.
*G08B 21/00* (2006.01)

(52) U.S. Cl.
USPC ................ 340/686.6; 340/686.1; 455/556.1; 455/575.1; 455/575.4; 455/575.8

(58) Field of Classification Search
USPC .............. 340/686.1, 686.6; 455/550.1, 556.1, 455/575.1, 575.4, 575.8
See application file for complete search history.

(56) References Cited

U.S. PATENT DOCUMENTS

| 5,400,246 A | * | 3/1995 | Wilson et al. ................... 700/17 |
| 5,959,529 A | * | 9/1999 | Kail, IV ................... 340/539.12 |
| 2003/0109275 A1 | | 6/2003 | Vander Veen et al. |
| 2004/0198477 A1 | | 10/2004 | Jung et al. |
| 2005/0288076 A1 | | 12/2005 | Seol |
| 2007/0270180 A1 | | 11/2007 | Takagi |

FOREIGN PATENT DOCUMENTS

| DE | 102004027606 A1 | 11/2005 |
| GB | 2424339 A | 9/2006 |
| WO | 2007119988 A1 | 10/2007 |

OTHER PUBLICATIONS

Extended European search report issued May 10, 2011 in respect of corresponding European Application No. 11155075.2.

* cited by examiner

*Primary Examiner* — Daryl Pope
(74) *Attorney, Agent, or Firm* — Novak Druce Connolly Bove + Quigg LLP (57) ABSTRACT

A portable electronic device includes a lower housing slidably coupled to an upper housing, the lower and upper housings being movable between a closed position and an open position, and a holster sized and shaped for holding the device in a holster position. The device also includes a first position sensor to detect proximity of at least one positioning object and output a first sensor output signal indicative of the proximity of the at least one positioning object to the first position sensor, a second position sensor to detect proximity of the at least one positioning object and output a second sensor output signal indicative of the proximity of the at least one positioning object to the second position sensor. The first and second sensor output signals cooperate to indicate whether the portable electronic device is in one of the open position, the closed position and the holster position.

16 Claims, 10 Drawing Sheets

PORTABLE ELECTRONIC DEVICE HAVING HOLSTER AND INCLUDING A PLURALITY OF POSITION SENSORS

RELATED APPLICATIONS

The present application is a continuation of U.S. patent application Ser. No. 13/030,884, filed Feb. 18, 2011, which claims the benefit of U.S. Provisional Patent Application No. 61/305,924, filed Feb. 18, 2010, each of said applications are expressly incorporated by reference herein in their entirety.

FIELD

The present disclosure relates to portable electronic devices, and in particular to portable electronic devices having a slidable upper housing and lower housing movable between an open position and a closed position, and including a plurality of position sensors for detecting the position of the portable electronic device and whether the portable electronic device is in a holster.

BACKGROUND

Electronic devices, including portable electronic devices, have gained widespread use and may provide a variety of functions including, for example, telephonic, electronic text messaging and other personal information manager (PIM) application functions. Portable electronic devices can include several types of devices including mobile stations such as simple cellular phones, smart phones, Personal Digital Assistants (PDAs), tablets and laptop computers.

Devices such as PDAs or smart phones are generally intended for handheld use and ease of portability. Smaller devices are generally desirable for portability. In some cases, such devices may be touch sensitive devices. For example, touch-sensitive devices constructed of a display, such as a liquid crystal display (LCD), with a touch-sensitive overlay may be useful on some handheld devices as such handheld devices tend to be small and are therefore limited in space available for user input and output devices. Further, in some cases the screen content on the touch-sensitive devices can be modified depending on the functions and operations being performed. In other examples, some personal electronic devices may not have touch sensitive displays.

BRIEF DESCRIPTION OF THE DRAWINGS

Embodiments of the present disclosure will now be described, by way of example only, with reference to the attached Figures, wherein.

DETAILED DESCRIPTION

In some embodiments, described herein is an electronic device that includes a housing, a touch-sensitive display exposed by a front of the housing, and functional components comprising a memory and a processor coupled to the memory and the touch-sensitive display.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the example embodiments described herein. The description is not to be considered as limited to the scope of the example embodiments described herein.

Figure 1:
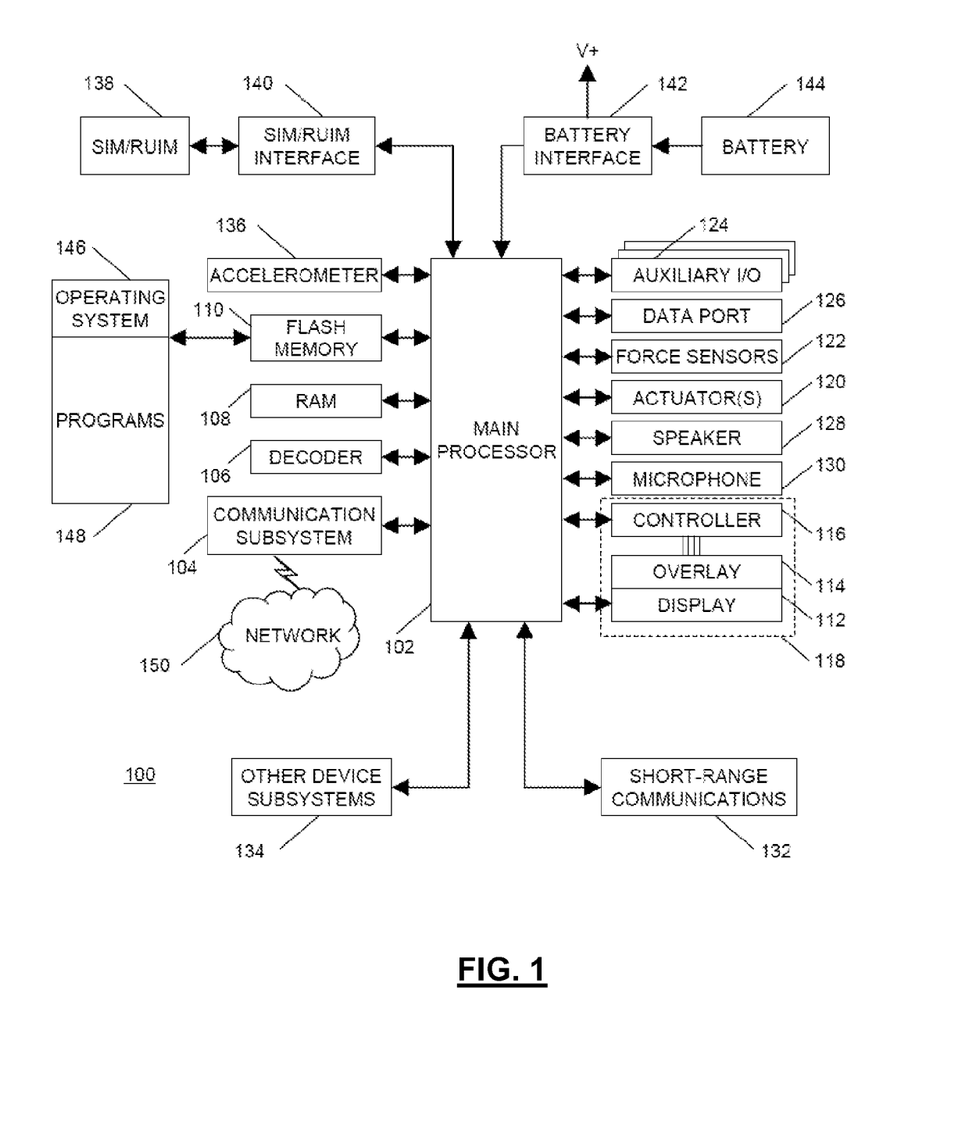
FIG. 1 is a simplified block diagram of components including internal components of a portable electronic device according to some embodiments.

FIG. 1 shows a simplified block diagram of components including internal components of a portable electronic device 100 according to some embodiments.

The portable electronic device 100 includes multiple components such as a processor 102 that controls the operations of the portable electronic device 100. Communication functions, including data communications, voice communications, or both, may be performed through a communication subsystem 104. Data received by the portable electronic device 100 may be decompressed and decrypted by a decoder 106. The communication subsystem 104 may receives messages from and send messages to a wireless network 150.

Generally, the wireless network 150 may be any type of wireless network, including, but not limited to, data-centric wireless networks, voice-centric wireless networks, and dual-mode networks that support both voice and data communications over the same physical base stations.

The portable electronic device 100 may be a battery-powered device and as shown may include a battery interface 142 for receiving one or more rechargeable batteries 144.

The processor 102 may also interact with additional subsystems such as a Random Access Memory (RAM) 108, a flash memory 110, a display 112 with a touch-sensitive overlay 114 connected to an electronic controller 116 that together may comprise a touch-sensitive display 118, an actuator assembly 120, one or more optional force sensors 122, an auxiliary input/output (I/O) subsystem 124, a data port 126, a speaker 128, a microphone 130, a short-range communications subsystem 132 and other device subsystems 134.

In some embodiments, user-interaction with the graphical user interface may be performed through the touch-sensitive overlay 114. The processor 102 may interact with the touch-sensitive overlay 114 via the electronic controller 116. Information, such as text, characters, symbols, images, icons, and other items that may be displayed or rendered on a portable electronic device, may be displayed on the touch-sensitive display 118 via the processor 102.

The processor 102 may also interact with an accelerometer 136 as shown in FIG. 1. In some embodiments, the accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the portable electronic device 100 may use a Subscriber Identity Module or a Removable User Identity Module (SIM/RUIM) card 138 inserted into a SIM/RUIM interface 140 for communication with a network (such as the wireless network 150). Alternatively, user identification information may be programmed into the flash memory 110.

The portable electronic device 100 may also include an operating system 146 and software components 148 that may be executed by the processor 102 and which may be stored in a persistent store such as the flash memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download may be processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104.

For voice communications, the overall operation of the portable electronic device 100 may be similar. For example, the speaker 128 may output audible information converted from electrical signals, and the microphone 130 may convert audible information into electrical signals for processing.

Figures 2, 3:
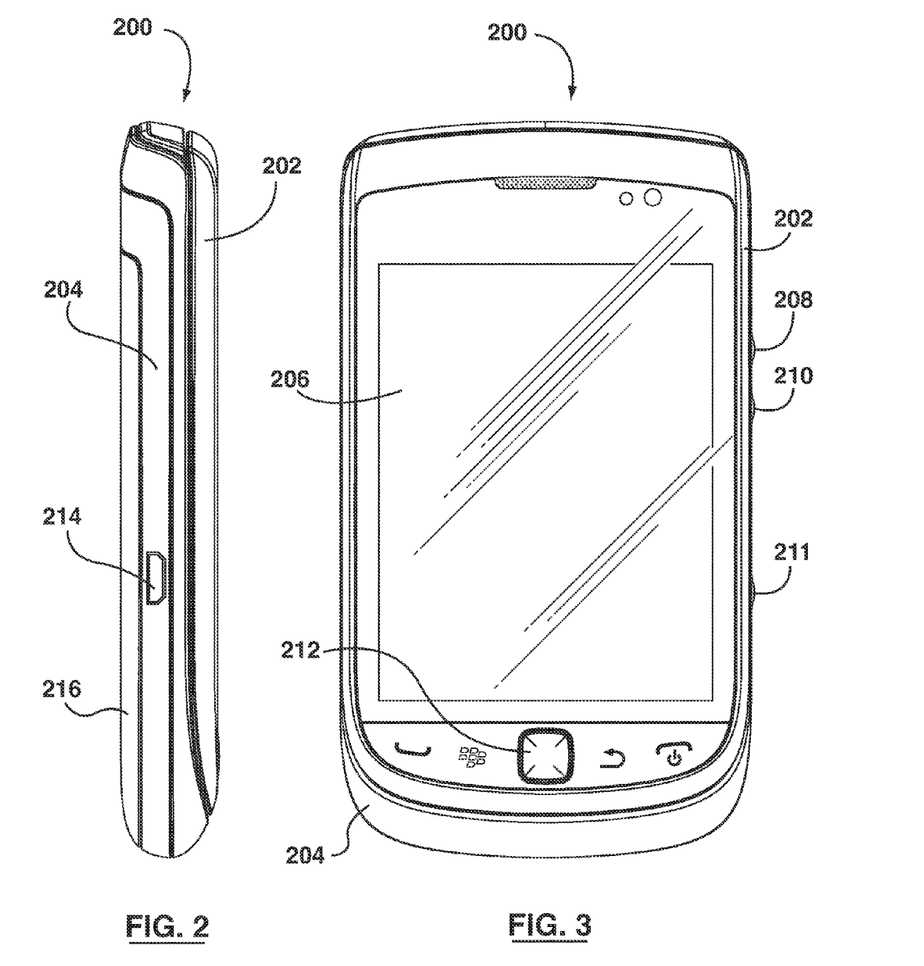
FIG. 2 is a first side view of a portable electronic device according to one embodiment shown in a closed position.
FIG. 3 is a front view of the portable electronic device of FIG. 2.
Figure 4:
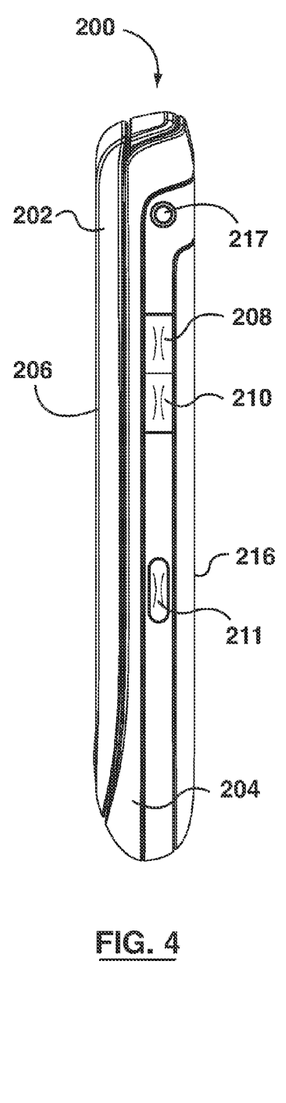
FIG. 4 is a second side view of the portable electronic device of FIG. 2.
Figure 5:
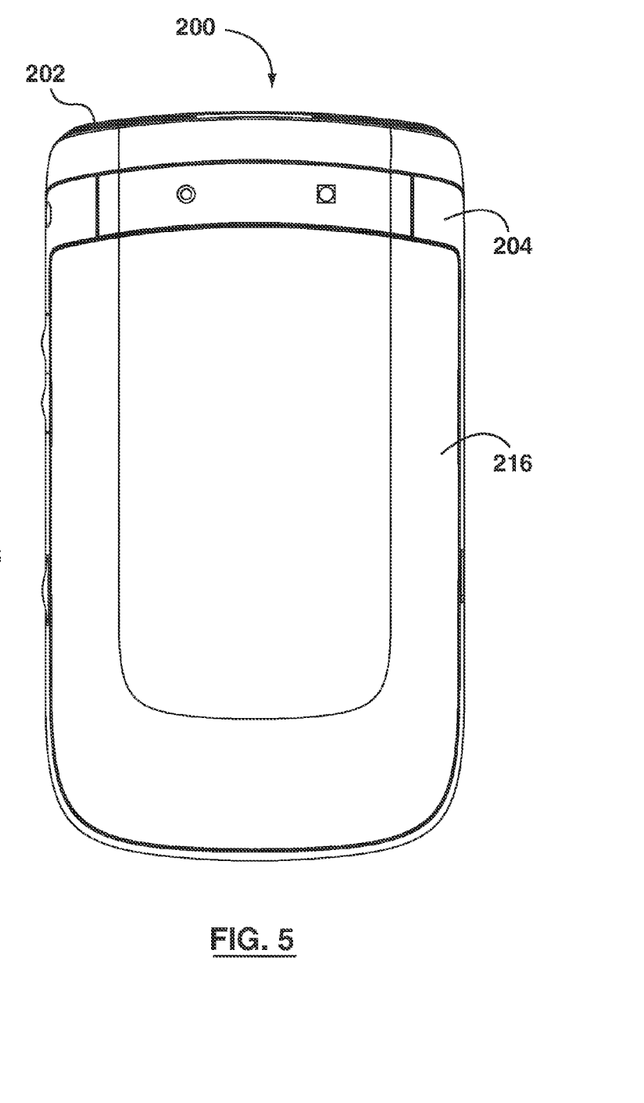
FIG. 5 is a back view of the portable electronic device of FIG. 2.
Figure 6:
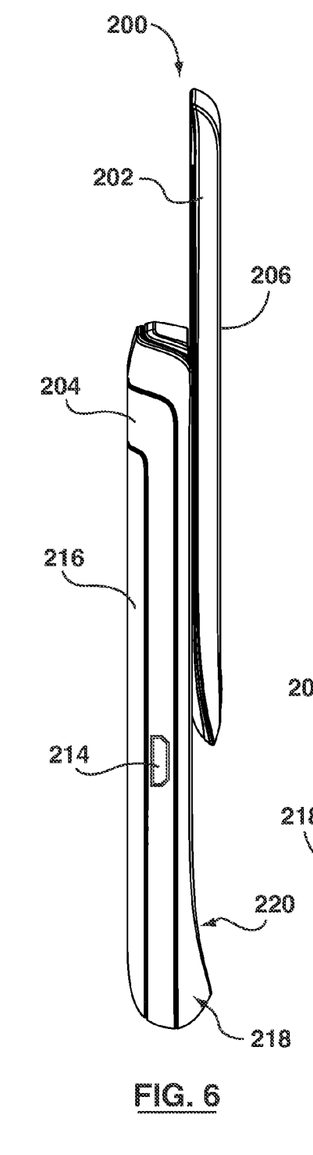
FIG. 6 is a first side view of the portable electronic device of FIG. 2 shown in an open position.
Figure 7:
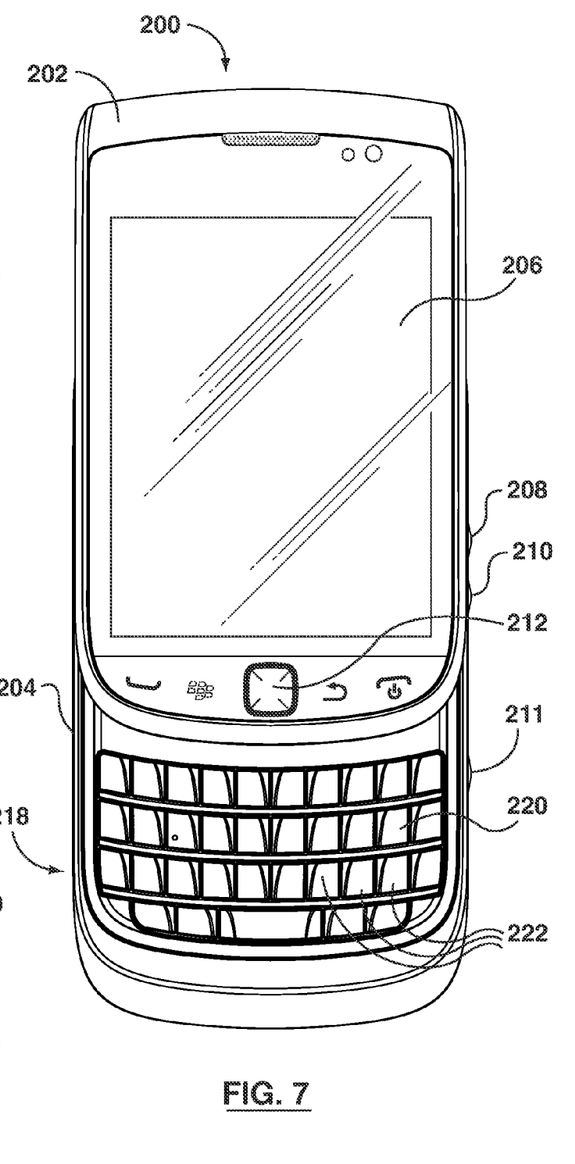
FIG. 7 is a front view of the portable electronic device of FIG. 6.
Figure 8:
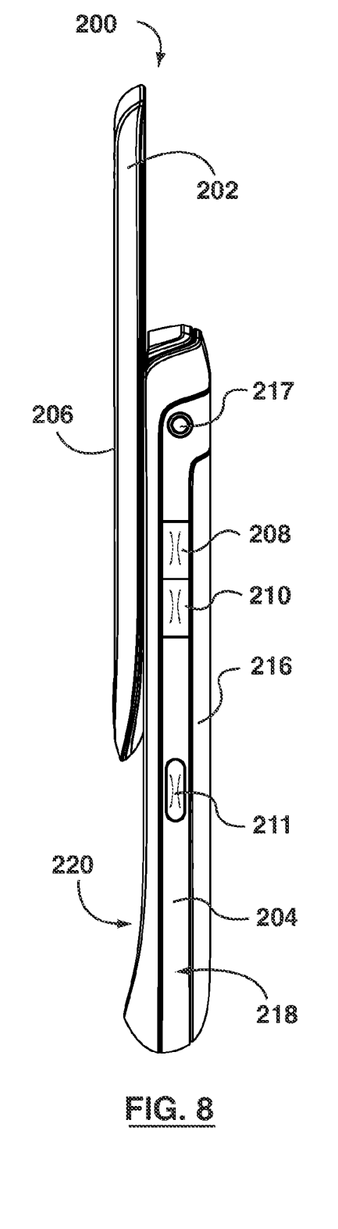
FIG. 8 is a second side view of the portable electronic device of FIG. 6.
Figure 9:
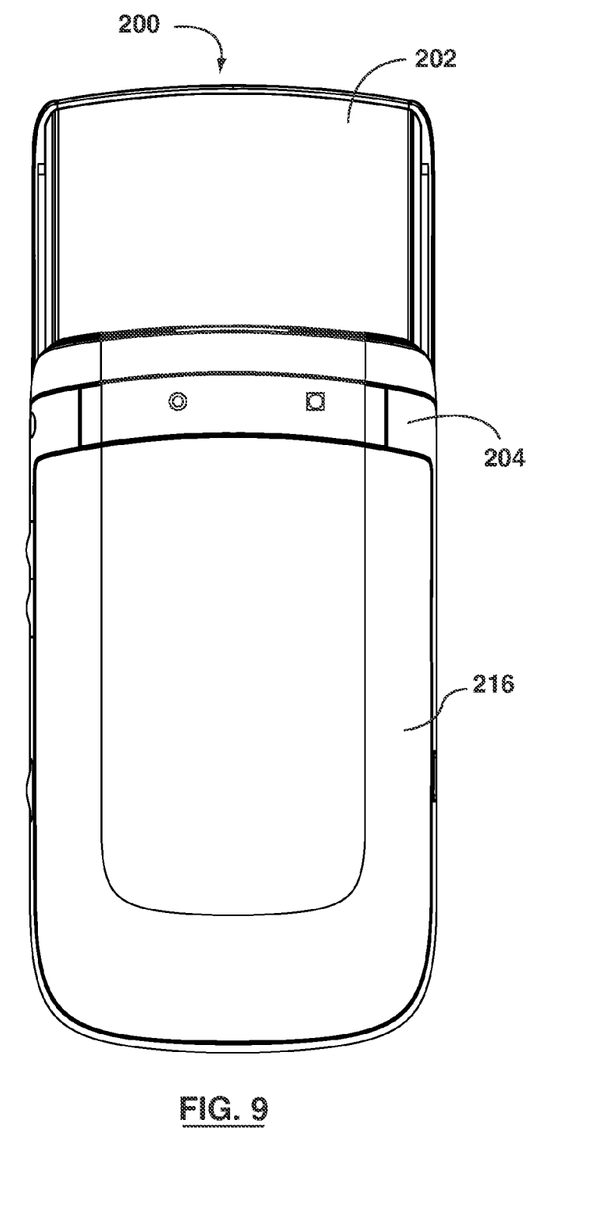
FIG. 9 is a back view of the portable electronic device of FIG. 6.
Figure 10:
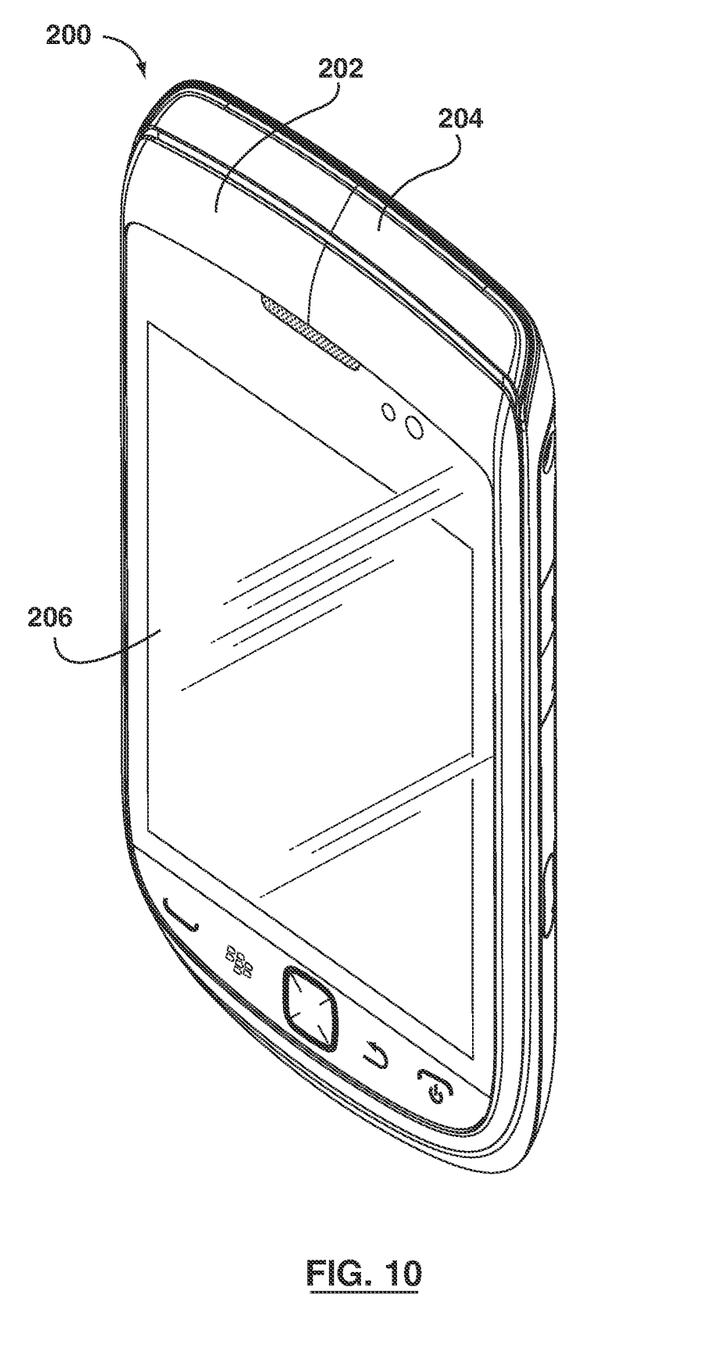
FIG. 10 is a perspective view of the portable electronic device of FIG. 2 shown in the closed position.
Figure 11:
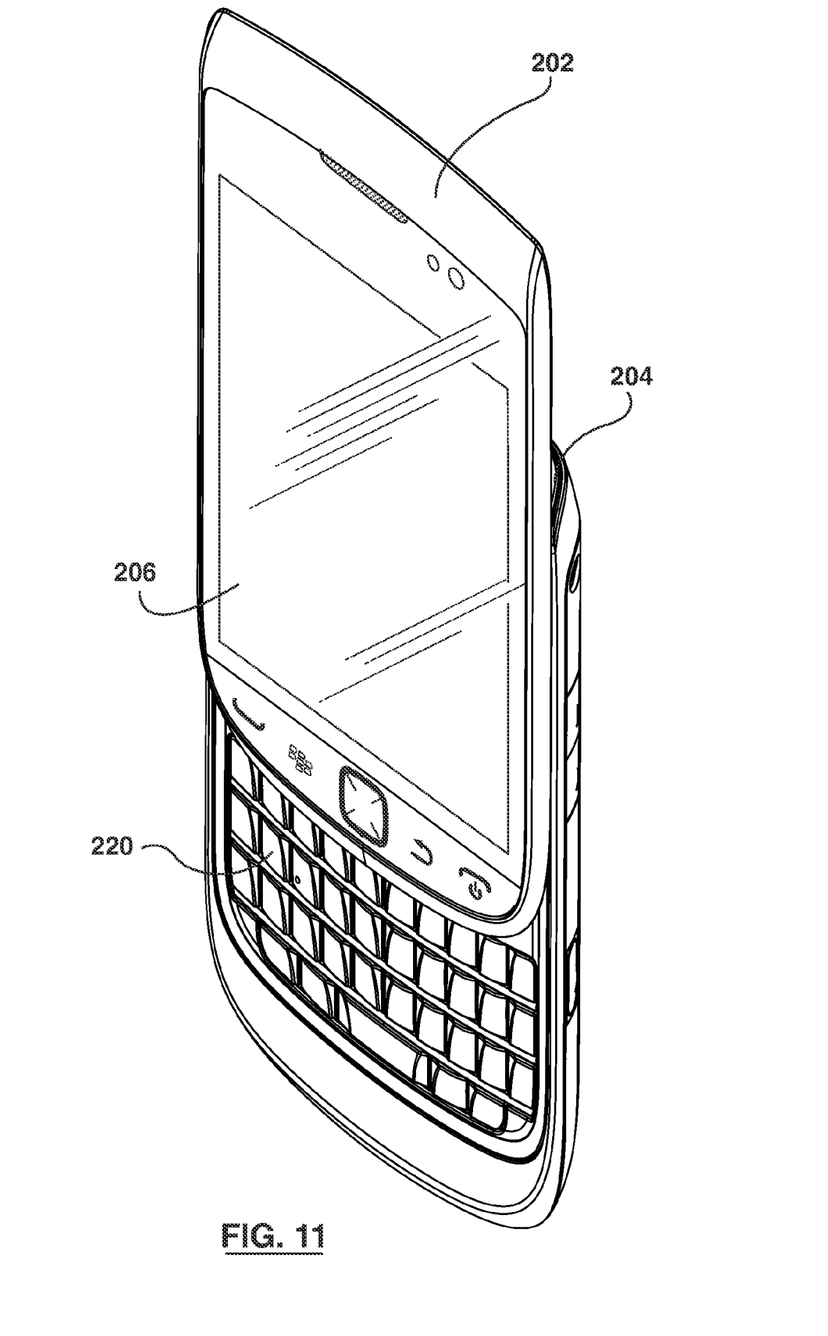
FIG. 11 is a perspective view of the portable electronic device of FIG. 6 shown in the open position.

Turning now to FIGS. 2 to 11, illustrated generally therein is a portable electronic device 200 according to one embodiment. The portable electronic device 200 generally includes an upper housing 202 (or sliding portion) and a lower housing 204 (or base portion). Generally, the upper housing 202 and lower housing 204 are coupled together and are slidable between a closed position (as shown in FIG. 2) and an open position (e.g. as shown in FIG. 6). The upper housing 202 generally includes a display 206, which could be an LCD display and which may have touch screen capabilities.

As shown, one or both of the upper housing 202 and lower housing 204 may include one or more input apparatus, such as navigation keys or buttons, a physical or virtual keyboard, a trackpad, trackball, multimedia keys, etc. For example, the upper housing 202 as shown includes an auxiliary input device 212. The auxiliary input device may be an optical navigation module (e.g. a trackpad) that responds to user interaction, and which may be used for navigating around the display screen 206, to select objects on the display screen, or for other purposes. In some other embodiments, the auxiliary input device 212 may be a mechanical device that responds to user interaction (e.g. a trackball).

The display 206 and the auxiliary input device 212 may be generally disposed on a front of the upper housing 202 and exposed for user accessibility when the portable electronic device 200 is in either of the open or closed positions.

The upper housing 202 may also include other input devices, such as a dedicated phone application button, a dedicated "disconnect call" button, a home screen button, etc. In various embodiments, one or more of these input devices may include optical sensors, mechanical buttons, or both.

Turning now to the lower housing 204, the lower housing 204 may include various buttons and other controls, such as buttons 208 and 210, and which could be used for navigation, to control volume or for other purposes.

The lower housing 204 could also include one or more application buttons 211 that can be used to automatically launch a particular application on the portable electronic device (e.g. a camera application, a phone application, etc.). In some embodiments, the button 211 may be configurable by a user (e.g. the user may be able to select the particular application or function that is launched by the button 211).

As shown in FIGS. 2 and 6, the lower housing 204 could also include one or more input or output ports (e.g. I/O ports), such as a microUSB port 214. In some examples, the port 214 may be used for data communication with the portable electronic device 200, for charging of a battery (not shown) on the device 200 or for both.

As shown, the lower housing 204 may also include a battery cover 216 for covering the battery. In some embodiments, the battery cover 216 may be removable. In other embodiments, the battery cover 216 may be permanently fixed to the device.

In some embodiments, the lower housing 204 may also include an audio jack 217. The audio jack 217 may be used to couple the portable electronic device 200 to an accessory such as a speaker, a microphone, or both, for example for use in voice communication.

Turning now to FIGS. 6 to 9 and 11, as shown when the portable electronic device 200 is in the open position, a keypad 220 is exposed on a lower portion 218 of the lower housing 204. The keypad 220 generally includes a plurality of alphanumeric keys 222, which may be positioned in a plurality of rows and columns. In some embodiments, the keys 222 may represent the alphabet and may be arranged with a standard keyboard layout (e.g. QWERTY, QWERTZ, DVORAK, etc.)

As shown in FIGS. 2 to 5, when the portable electronic device 200 is in the closed position, the keypad 220 is covered by the upper housing 202. This may be beneficial as it may protect the keypad 220 when not in use, and may also inhibit undesired keys from being pressed when the user is carrying the portable electronic device 200 (e.g. in a pocket). However, in some cases (e.g. when the display 206 is a touchsceen) the user may be able to perform functions on the portable electronic device 200 while the portable electronic device 200 is closed by interacting with the display screen 206 (e.g. using buttons 208, 210, 211, the auxiliary input device 212, the display screen 206 itself, etc.).

Alternatively, when the portable electronic device 200 is in the open position (as shown in FIGS. 6 to 9 and 11), the keypad 220 is exposed for user accessibility.

In some embodiments, the display 206 may be a touch-sensitive display. The touch-sensitive display may be a capacitive touch-sensitive display, for example, and a user's touch on the touch-sensitive display may be determined by determining an X and Y location of the touch, with the X location determined by a signal generated as a result of capacitive coupling with a touch sensor layer and the Y location determined by the signal generated as a result of capacitive coupling with another touch sensor layer. Each of the touch-sensor layers may provide a signal to a controller that represents the respective X and Y touch location values. Thus a feature such as a virtual button or other feature displayed on the touch-sensitive display may be selected by a mapping of the touch location to a feature on the touch-sensitive display.

In some embodiments, the portable electronic device 200 is generally taller than it is wide. In such embodiments, as the portable electronic device 200 moves between the open position and the closed position, the upper housing 202 and lower housing 204 move along a longitudinal axis of the portable electronic device 200.

Figure 14:
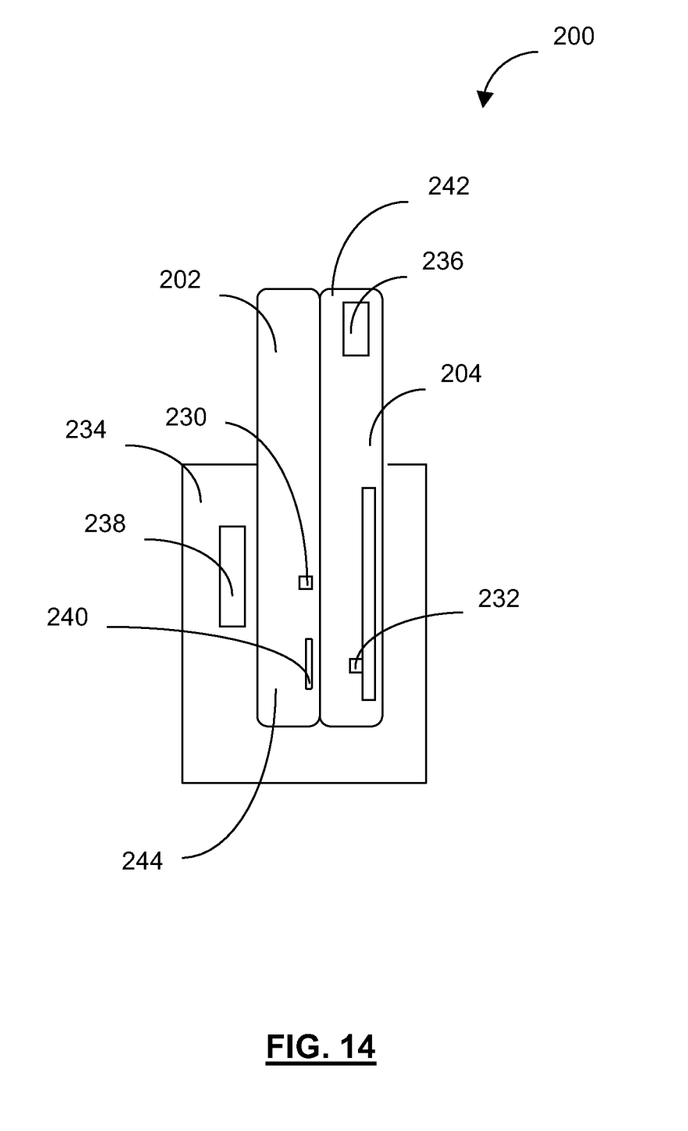
FIG. 14 is a side view of the portable electronic device of FIG. 12 shown in the closed position and in a holster.

In some embodiments, the portable electronic device 200 is provided with a holster 234 (see FIG. 14). The portable electronic device 200 may be placed in the holster 234 when the portable electronic device 200 is not in use, for example, or in other cases such as when the portable electronic device 200 is being used with a headset. The holster 234 may, for example, help to prevent accidental key-presses of the keypad 220.

Portable electronic devices that are movable between multiple positions (i.e. an open position and a closed position, such as portable electronic device 200) typically include at least one sensor to detect the position of the portable electronic device. This tends to allow for enabling or disabling of certain features based on the position of the portable electronic device 200. For example, power may be supplied to some or all the input devices (i.e. display screen 206, auxiliary input device 212, buttons 208 and 210, application button 211 and the keypad 220) when the portable electronic device 200 is in the open position, and power may be cut-off to some or all of the input devices (i.e. keypad 220) when the portable electronic device 200 is in the closed position.

It is also typically beneficial to know when the portable electronic device 200 is in the holster 234. In some embodiments, for example, this may allow for configurable notification settings. For example, in one configuration the portable electronic device 200 may use a vibration alert for an incoming call when the portable electronic device 200 is in the holster 234, and a ring alert for an incoming call when the portable electronic device 200 is out of the holster 234. Other notification settings may also be selected and be dependent on whether the portable electronic device 200 is in the holster 234 or out of the holster 234.

Furthermore, in some embodiments various features may be disabled when the portable electronic device 200 is in the holster 234. This may be beneficial as it may aid in reducing power consumption.

In some embodiments, the portable electronic device 200 includes two position sensors for detecting when the portable electronic device 200 is in one of three positions: (1) open position (i.e. the keypad 220 is exposed); (2) closed position (i.e. the keypad 220 is covered); and (3) holster position (i.e. when the portable electronic device 200 is in the holster 234).

Figure 12:
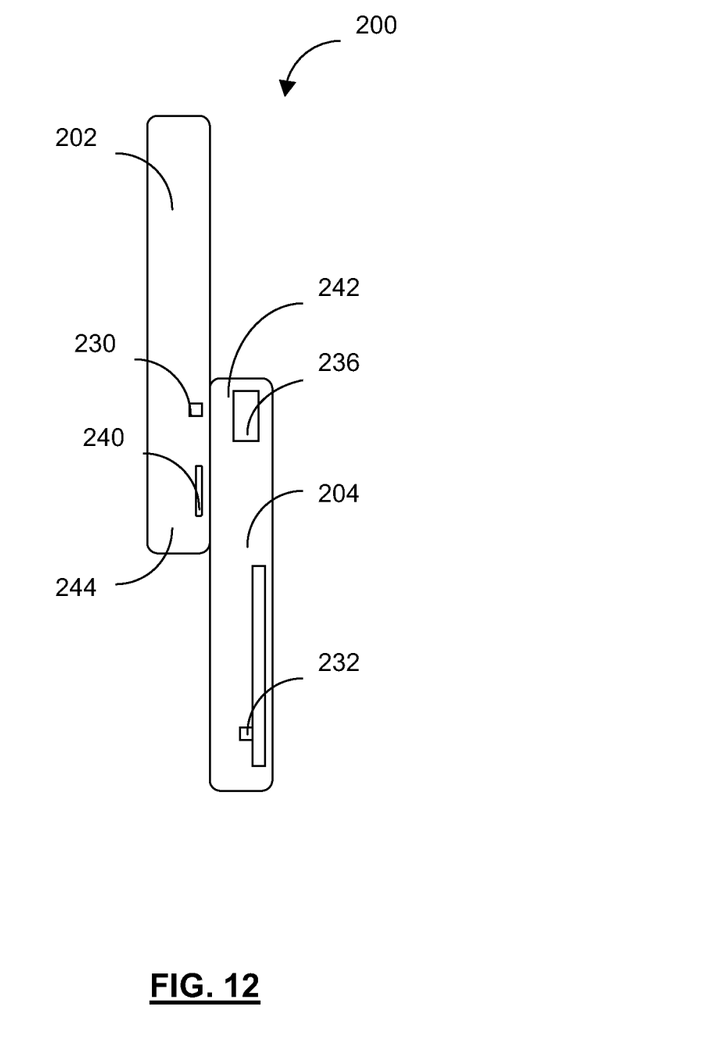
FIG. 12 is a side view of the portable electronic device of FIG. 2 shown in the open position wherein the portable electronic device has a first position sensor and a second position sensor.
Figure 13:
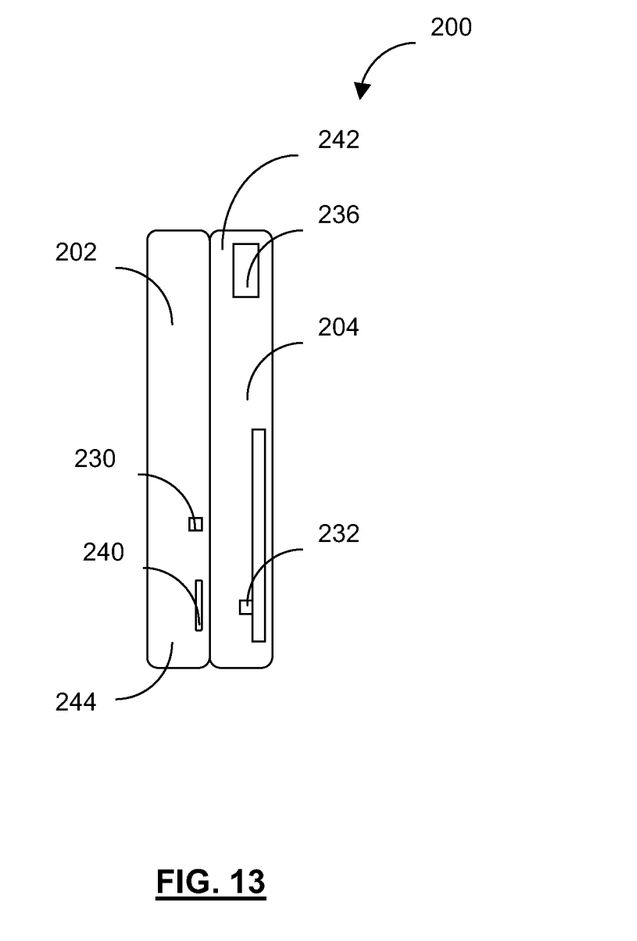
FIG. 13 is a side view of the portable electronic device of FIG. 12 shown in the closed position.

Reference is now made to FIGS. 12 to 14, which illustrate schematic side views of the portable electronic device 200 having a first position sensor 230 and a second position sensor 232. Specifically, FIG. 12 is a side view of the portable electronic device 200 in the open position, FIG. 13 is a side view of the portable electronic device 200 in the closed position, and FIG. 14 is a side view of the portable electronic device 200 in the closed position and in the holster 234.

The two position sensors 230 and 232 are typically situated on opposite housing modules (e.g. one position sensor is situated on the upper housing 202, and one position sensor is situated on the lower housing 204). For example, in the embodiment shown in FIGS. 12 to 14, the first position sensor 230 is situated on the upper housing 202 and the second sensor 232 is situated on the lower housing 204.

The first position sensor 230 and the second position sensor 232 cooperate together to detect whether the portable electronic device 200 is in the open position, the closed position or the holster position (i.e. the portable electronic device 200 is in the holster 234). Specifically, in some embodiments each position sensor 230 and 232 may be operable detect the presence of one or more corresponding objects or fields (i.e. magnetic field) and output a sensor output signal indicating the presence or absence of the corresponding objects or fields.

The position sensors 230 and 232 are positioned sufficiently far apart on the upper and lower housings 202 and 204 respectively so that regardless of the position (open/closed/holster) of the portable electronic device 200 both sensors 230 and 232 normally cannot be triggered by the same object or field simultaneously. Specifically, the position sensors 230 and 232 may be positioned sufficiently far apart so that the objects or fields used to trigger the first position sensor 230 will not simultaneously trigger the second position sensor 232, and the objects or fields used to trigger the second position sensor 232 will not simultaneously trigger the first position sensor 230.

In some embodiments, the sensor output signal produced by the position sensors 230 and 232 is a binary signal (i.e. High/Low, On/Off, 1/0, etc.) that indicates either (i) the presence of a corresponding object or field; or (ii) the absence of a corresponding object or field. In these embodiments, the positions sensors 230 and 232 can be thought of as either "ON" (presence of a corresponding object or field), or "OFF" (absence of a corresponding object or field).

In some embodiments the position sensors 230 and 232 are magnetic sensors, such as Hall Effect Sensors, that detect the presence of a magnetic field. As is known to those of skill in the art, a Hall Effect Sensor is a transducer that varies its output voltage in response to changes in magnetic field. In the embodiment shown in FIGS. 12 to 14, the first position sensor 230 detects the presence or absence of the magnetic fields produced by a first magnet 236 and a second magnet 238 (FIG. 14), and the second position sensor 232 detects the presence or absence of the magnetic field produced by a third magnet 240. In some embodiments, the first, second and third magnets 236, 238 and 240 are small (i.e. less than 5 mm tall).

The first magnet 236 may be positioned in an upper portion 242 of the lower housing 204 so that when the portable electronic device 200 is in the open position the first magnet 236 aligns with the first position sensor 230 (see FIG. 12). Accordingly, when the portable electronic device 200 is in the open position, the first position sensor 230 may detect the magnetic field produced by the first magnet 236 and output a sensor output signal indicative of the detection. As a result, when the portable electronic device 200 is in the open position, the first position sensor 230 is "ON".

In one embodiment, the first magnet 236 is the magnet inherent in the speaker of the portable electronic device 200 (i.e. speaker 128). Accordingly, in this embodiment, a separate magnet is not required to detect whether the portable electronic device 200 is in the open position. This may reduce the cost of the portable electronic device 200. This may also reduce the size of the portable electronic device 200.

In some embodiments, the third magnet 240 is positioned in a lower portion 244 of the upper housing 202 so that when the portable electronic device 200 is in the closed position the third magnet 240 aligns with the second position sensor 232 (see FIG. 13). Accordingly, when the portable electronic device 200 is in the closed position, the second position sensor 232 will detect the magnetic field produced by the third magnet 240 and output a sensor signal indicative of the detection.

The first magnet 236 may be positioned on the upper portion 242 of the lower housing 204 so that when the portable electronic device 200 is in the closed position there is sufficient distance between the first magnet 236 and the first position sensor 230 so that the first position sensor 230 will not detect the magnetic field produced by the first magnet 236. Accordingly, when the portable electronic device 200 is in the closed position, the first position sensor 230 will be "OFF" and the second position sensor 232 will be "ON".

As shown in FIG. 14, the second magnet 238 is positioned on the holster 234 so that when the portable electronic device 200 is in the holster position (i.e. the portable electronic device 200 is placed in the holster 234), the second magnet 238 aligns with the first position sensor 230 (see FIG. 14). Accordingly, when the portable electronic device 200 is in the holster position, the first position sensor 230 will detect the magnetic field produced by the second magnet 238 and output a sensor signal indicative of the detection.

In some embodiments, since generally the portable electronic device 200 can typically only be put in the holster 234 when in the closed position, when the portable electronic device 200 is in the holster position, typically both the first position sensor 230 and the second position sensor 232 will be "ON".

In some embodiments, the first position sensor 230 produces a single sensor output signal that indicates the presence or absence of a magnetic field irrespective of which magnet (i.e. the first magnet 236 or the second magnet 238) produced the magnetic field. In other embodiments, the first position sensor 230 may produce multiple sensor output signals, each signal indicating the presence or absence of a specific magnetic field. For example, the first position sensor 230 may produce a first sensor output signal that indicates the presence or absence of the magnetic field produced by the first magnet 236, and a second sensor output signal that indicates the presence or absence of the magnetic field produced by the second magnet 238.

In one embodiment, the first position sensor 230 is a polarity-dependent magnetic sensor that produces two sensor output signals. The first sensor output signal indicates the presence or absence of an N-pole magnetic field, and the second sensor output signal indicates the presence or absence of an S-pole magnetic field. In this embodiment, the first position sensor 230 is capable of distinguishing an N-pole magnetic field produced by one magnet (i.e. the first magnet 236) from an S-pole magnetic field produced by another magnet (i.e. the second magnet 238). Accordingly, if one of the first and second magnets 236 and 238 produces an N-pole magnetic field and the other produces an S-pole magnetic field, the first position sensor 230 can distinguish between the magnetic field produced by the first magnet 236 and the magnetic field produced by the second magnet 238.

In another embodiment, the first position sensor 230 may include a plurality of dies with different magnetic field strength triggering points in a single package. For example, if the first magnet 236 produces a magnetic field of strength A, and the second magnet 238 produces a magnetic field of strength B, the first position sensor 230 may be provided with two dies. The first die may trigger above magnetic field strength A, and the second die may trigger above magnetic field strength B. It may then be possible to determine which of the two magnets (the first magnet 236 or the second magnet 238) triggered the first position sensor 230 based on which of the two dies was triggered.

Although the position sensors 230 and 232 have been described above as being magnetic sensors, it will be evident to a person of skill in the art that other types of sensors may be used. For example, in other embodiments, the positions sensors 230 and 232 may be proximity sensors. However, if proximity sensors are used, objects, such as a user's hand, may interfere with the proximity sensor's ability to accurately detect the position of the portable electronic device.

In other embodiments the position sensors 230 and 232 may be mechanical sensors, such as a mechanical switch.

In some embodiments, the portable electronic device 200 may also include a state determiner (not shown) that receives the sensor output signals from the position sensors 230 and 232 and determines the position of the portable electronic device 200 based on the sensor outputs signals. For example, in the embodiment shown in FIGS. 12 to 14, the state determiner may determine that (i) the portable electronic device 200 is in the open position when the first position sensor 230 is "ON" and the second position sensor 232 is "OFF; (ii) the portable electronic device 200 is in the closed position when the first position sensor 230 is "OFF", and the second position sensor 232 is "ON"; and (iii) the portable electronic device 200 is in the holster position when the first position sensor 230 is "ON" and the second position sensor 232 is "ON".

The state determiner may be implemented in software, hardware, firmware or any appropriate combination thereof. In one embodiment, the state determiner is implemented in software that is executed on the processor (i.e. processor 102) of the portable electronic device 200. In other embodiments, the state determiner is separate and distinct from the processor (i.e. processor 102).

In some embodiments, the processor (i.e. processor 102) may execute one or more actions based on the position of the portable electronic device 200. For example, the processor (i.e. processor 102) may provide power to one or more input devices (i.e. display screen 206, auxiliary input device 212, buttons 208 and 210, application button 211 and the keypad 220) when the portable electronic device 200 is in the open position, and disable or turn off power to at least one of the input devices (i.e. keypad 220) when the portable electronic device 200 is in the closed position. In some embodiments, all input devices (i.e. display screen 206, auxiliary input device 212, buttons 208 and 210, application button 211 and the keypad 220) may be disabled when the portable electronic device 200 is in the holster position.

In a further example, the processor (i.e. processor 102) may provide visual notification of an incoming call using the display screen 206 when the portable electronic device 200 is in the open position or the closed position, and an audio notification of an incoming call when the portable electronic device 200 is in the holster position. It will be evident to a person of skill in the art that these are exemplary actions only and the processor (i.e. processor 102) may be configured to execute other actions based on the position of the portable electronic device 200.

While the above description provides examples of one or more processes or apparatuses, it will be appreciated that other processes or apparatuses may be within the scope of the accompanying claims.

The invention claimed is:

1. A portable electronic device, comprising:
a lower housing;
an upper housing movably coupled to the lower housing, the lower housing and the upper housing movable between a closed position and an open position, the lower housing and upper housing sized and shaped for placement in a storage device;

a first position sensor operable to detect proximity of at least one positioning object and output a first sensor output signal indicative of the proximity of the at least one positioning object to the first position sensor; and a second position sensor operable to detect proximity of the at least one positioning object and output a second sensor output signal indicative of the proximity of the at least one positioning object to the second position sensor;

wherein the first and second sensor output signals cooperate to indicate whether the portable electronic device is in one of the open position, the closed position and a stored position in the storage device;

further comprising a processor adapted to determine whether the portable electronic device is in one of the open position, the closed position and the stored position based on a combination of the first sensor output signal and second sensor output signal;

and wherein:

each of the first sensor output signal and second sensor output signal is in one of an ON state indicating that the sensors are in the proximity of the at least one positioning object and an OFF state indicating that the sensors are not in the proximity of the at least one positioning object;

the processor is operable to determine that the portable electronic device is in the open position when the first position sensor is in the ON state and the second position sensor is in the OFF state;

the processor is operable to determine that the portable electronic device is in the closed position when the first position sensor is in the OFF state and the second position sensor is in the ON state; and the processor is operable to determine that the portable electronic device is in the stored position when the first position sensor is in the ON state and the second position sensor is in the ON state.

2. The portable electronic device of claim 1, wherein the storage device is a case comprising at least one positioning object detectable by at least one of the position sensors when the portable electronic device is in the storage position.

3. The portable electronic device of claim 2, wherein the at least one positioning object comprises a first positioning object in the lower housing and a second positioning object in the case, and the first position sensor operable to detect the first positioning object and the second positioning object.

4. The portable electronic device of claim 3, wherein the first positioning object is positioned in the upper housing and is detectable by the first position sensor when the electronic device is in the open position.

5. The portable electronic device of claim 3, wherein the second positioning object is positioned in the case and is detectable by the first position sensor when the portable electronic device is in the storage position.

6. The portable electronic device of claim 3, wherein the at least one positioning object further comprises a third positioning object in the lower housing, and the second position sensor is operable to detect the third positioning object in the lower housing.

7. The probable electronic device of claim 6, wherein the third positioning object is positioned in the lower housing and is detectable by the second position sensor when the portable electronic device is in the closed position.

8. The portable electronic device of claim 1, wherein the at least one positioning object comprises at least one magnet having a magnetic field, and the at least one position sensor comprises a magnetic sensor operable to detect the magnetic field.

9. The portable electronic device of claim 1, wherein at least one of the first position sensor and the second position sensor is a Hall Effect Sensor.

10. The portable electronic device of claim 1, wherein the at least one of the first position sensor and the second position sensor is a polarity-dependent sensor operable to output a sensor output signal indicative of the proximity of one of a S-pole magnetic field and a N-pole magnetic field, or an absence of detectable magnetic fields.

11. The portable electronic device of claim 1, wherein the portable electronic device modifies an operation of at least one feature of the portable electronic device when the portable electronic device is in the storage position.

12. The portable electronic device of claim 1, wherein the portable electronic device is configured to reduce power consumption when the portable electronic device is in the storage position.

13. The portable electronic device of claim 1, wherein the portable electronic device is configured to modify a notification setting when the portable electronic device is in the storage position.

14. The portable electronic device of claim 1, further comprising at least one input device and wherein the portable electronic device is configured to disable the at least one input device when the portable electronic device is in the storage position.

15. A portable electronic device, comprising:

a lower housing;

an upper housing movably coupled to the lower housing, the lower housing and the upper housing movable between a closed position and an open position;

a first magnetic sensor operable to detect proximity of at least one magnet and output a first sensor output signal indicative of the proximity of the at least one magnet to the first magnetic sensor; and a second magnetic sensor operable to detect proximity of the at least one magnet and output a second sensor output signal indicative of the proximity of the at least one magnet to the second magnetic sensor;

wherein the first and second sensor output signals cooperate to indicate whether the portable electronic device is in one of the open position, the closed position and a storage position in a storage device;

further comprising a processor adapted to determine whether the portable electronic device is in one of the open position, the closed position and the storage position based on a combination of the first sensor output signal and second sensor output signal;

wherein:

each of the first sensor output signal and second sensor output signal is in one of an ON state indicating that the magnetic sensors are in the proximity of the at least one magnet and an OFF state indicating that the magnetic sensors are not in the proximity of the at least one magnet;

the processor operable to determine that the portable electronic device is in the open position when the first magnetic sensor is in the ON state and the second magnetic sensor is in the OFF state;

the processor is operable to determine that the portable electronic device is in the closed position when the first magnetic sensor is in the OFF state and the second magnetic sensor is in the ON state; and the processor is operable to determine that the portable electronic device is in the storage position when the first magnetic sensor is in the ON state and the second magnetic sensor is in the ON state.

16. The portable electronic device of claim 15, wherein the storage device comprises at least one magnet detectable by at least one of the magnetic sensors when the portable electronic device is in the storage position, and at least one of the magnetic sensors is operable to output at least one output signal indicative of the proximity of the at least one magnet in the storage device to that magnetic sensor.

* * * * *